US008087071B2

(12) United States Patent
Delia et al.

(10) Patent No.: US 8,087,071 B2
(45) Date of Patent: Dec. 27, 2011

(54) AUTHENTICATION METHOD AND SYSTEM

(75) Inventors: Wayne Michael Delia, Poughkeepsie, NY (US); Edward Emile Kelley, Wappingers Falls, NY (US); Franco Motika, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 476 days.

(21) Appl. No.: 12/329,229

(22) Filed: Dec. 5, 2008

(65) Prior Publication Data

US 2010/0146606 A1  Jun. 10, 2010

(51) Int. Cl.
*G06F 17/30* (2006.01)
(52) U.S. Cl. .................... 726/5; 726/3; 726/2
(58) Field of Classification Search ........... 726/5, 3, 726/2
See application file for complete search history.

(56) References Cited

U.S. PATENT DOCUMENTS

| | | |
|---|---|---|
| 2004/0153656 A1 | 8/2004 | Cluts et al. |
| 2005/0119991 A1 | 6/2005 | Delgrosso et al. |
| 2007/0226164 A1 | 9/2007 | Geib et al. |
| 2007/0241861 A1 | 10/2007 | Venkatanna et al. |
| 2008/0154773 A1 | 6/2008 | Ranzini et al. |

OTHER PUBLICATIONS

Bypass Oracle Logon Trigger; Alexander Kornbrust; Apr. 17, 2007 (V 1.00).*
An Enhanced Remote User Authentication Scheme Providing Mutual Authentication and Key Agreement with Smart Cards Chun-Ta Li; Information Assurance and Security, 2009. IAS '09. Fifth International Conference on vol. 1; Publication Year: 2009 , pp. 517-520.*
Security Analysis of the Simple Lightweight Authentication Protocol ; Gódor, G.; Imre, S.; Networks (ICN), 2010 Ninth International Conference on; Publication Year: 2010 , pp. 231-236.*
MYSQL Security Best Practices; Zoratti, I.; Crime and Security, 2006. The Institution of Engineering and Technology Conference on Publication Year: 2006 , pp. 183-198.*

* cited by examiner

*Primary Examiner* — David Y Jung
(74) *Attorney, Agent, or Firm* — Schmeiser, Olsen & Watts; John Pivnichny

(57) ABSTRACT

An authentication method and system. A computing system generates an authentication table associated with a user. The computing system receives first authentication data and second authentication data differing from the first authentication data. The first authentication data and the second authentication data are placed in the authentication table. The authentication table comprising the first authentication data and the second authentication data is stored in the computing system. The computing system generates an action table. The computing system receives first action data and second action data and places the first action data and the second action data in the action table. The action table comprising the first action data and the second action data is stored in the computing system.

18 Claims, 3 Drawing Sheets

AUTHENTICATION METHOD AND SYSTEM

FIELD OF THE INVENTION

The present invention relates to a method and associated system for providing and implementing multiple authentication means for authenticating a user.

BACKGROUND OF THE INVENTION

Providing access to a system typically comprises an inefficient process with little flexibility. Accordingly, there exists a need in the art to overcome the deficiencies and limitations described herein above.

SUMMARY OF THE INVENTION

The present invention provides a method, comprising:
receiving, by a computing system from a user, a first command for generating an authentication table associated with said user;
generating, by said computing system in response to said first command, said authentication table;
receiving, by said computing system from said user, first authentication data and second authentication data, wherein said first authentication data comprises a first authentication method, wherein said second authentication data comprises a second authentication method, and wherein said first authentication method differs from said second authentication method;
placing, by said computing system, said first authentication data in a first entry row of said authentication table;
placing, by said computing system, said second authentication data in a second entry row of said authentication table;
storing, by said computing system, said authentication table comprising said first authentication data and said second authentication data;
receiving, by said computing system from said user, a second command for generating an action table associated with said user and said authentication table;
generating, by said computing system in response to said second command said action table;
receiving, by said computing system from said user, first action data and second action data, wherein said first action data comprises a first condition and a first associated action, and wherein said second action data comprises a second condition and a second associated action;
placing, by said computing system, said first action data in a first entry row of said action table;
placing, by said computing system, said second action data in a second entry row of said action table; and
storing, by said computing system, said action table comprising said first action data and said second action data.

The present invention provides a computing system comprising a processor coupled to a computer-readable memory unit, said memory unit comprising instructions that when executed by the processor implements an authentication method, said method comprising;
receiving, by said computing system from a user, a first command for generating an authentication table associated with said user;
generating, by said computing system in response to said first command, said authentication table;
receiving, by said computing system from said user, first authentication data and second authentication data, wherein said first authentication data comprises a first authentication method, wherein said second authentication data comprises a second authentication method, and wherein said first authentication method differs from said second authentication method;
placing, by said computing system, said first authentication data in a first entry row of said authentication table;
placing, by said computing system, said second authentication data in a second entry row of said authentication table;
storing, by said computing system, said authentication table comprising said first authentication data and said second authentication data;
receiving, by said computing system from said user, a second command for generating an action table associated with said user and said authentication table;
generating, by said computing system in response to said second command said action table;
receiving, by said computing system from said user, first action data and second action data, wherein said first action data comprises a first condition and a first associated action, and wherein said second action data comprises a second condition and a second associated action;
placing, by said computing system, said first action data in a first entry row of said action table;
placing, by said computing system, said second action data in a second entry row of said action table; and
storing, by said computing system, said action table comprising said first action data and said second action data.

The present invention advantageously provides a system and associated method capable of providing access to a system.

DETAILED DESCRIPTION OF THE INVENTION

Figure 1:
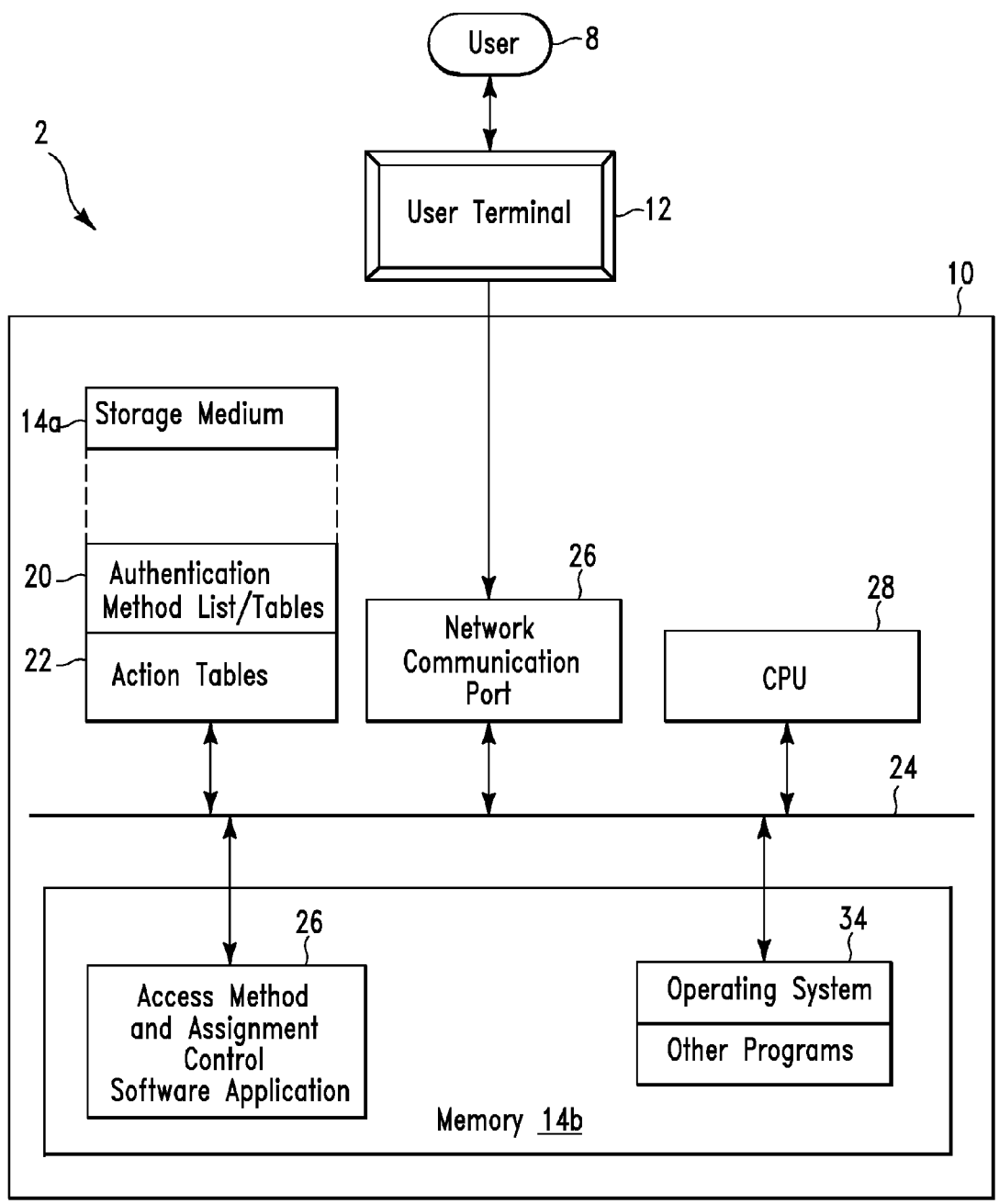
FIG. 1 illustrates a block diagram view of a system for providing and implementing multiple authentication means for authenticating a user, in accordance with embodiments of the present invention.

FIG. 1 illustrates a block diagram view of a system 2 for providing and implementing multiple authentication means for authenticating a user, in accordance with embodiments of the present invention. System 2 provides user authentication for system access to secure transactions. System 2 allows for establishment, sequencing, coordination, and automatic enforcement of several different authentication methods. System 2 performs an operating system-level authentication method that enables a designation and rotational/combinational use of a stack of different password derivations when multiple authentication methods for system access are available. The multiple authentication methods may comprise, inter alia, fingerprint authentication, facial recognition authentication, iris/retina scan authentication, voice recognition authentication, DNA matching authentication (i.e., in addition to a standard character password), etc. A software application requiring passwords will periodically and randomly change the authentication method for deriving passwords. Additionally, the authentication method may also change when there has been an incident that would affect the security of an application. As a first example, passwords may be compromised when a laptop computer containing an account/password database is stolen. As a second example, a virus may be detected to exist on a computer workstation. In order to enable system 2 to provide multiple authentication means for authenticating a user, the users will be required to provide passwords based on a variety of methods such as, inter alia, those derived from fingerprints, facial recognition, iris/retina scans, voice recognition, DNA matching in addition to the standard character password, etc. An application owner will periodically change the method to produce different passwords. For example, initially a voice recognition authentication method will be used and after a specified period of time the application will require a fingerprint authentication method instead of the voice recognition authentication method. Additionally, multiple methods for producing passwords may be required (e.g., an iris/retina recognition authentication method and a character password authentication method).

System 2 enables two capabilities in operating system and application system security:
1. Effective time intervals may be defined corresponding to common units of time in a calendar (e.g., a 31-day interval defined for an application method to be used in a calendar month which has 31 days).
2. A "pseudo-permanent" application method may be enabled within a security system requiring the use of at least "n" iterations of method changes. Initially, a stack of authentication methods is enabled to begin with a desired "pseudo-permanent" method and an effective time interval of the longest time duration permitted by the system. Next "n" arbitrarily-chosen authentication methods with a defined effective time interval of 0 may be enabled.

System 2 comprises a user terminal 12 connected to a computing system 10 (e.g., a computer work station). User terminal 12 may be connected to computing system 10 via a network such as, inter alia, a local area network, (LAN), a wide area network (WAN), the Internet, etc. Computing system 10 may comprise any type of computing system(s) including, inter alia, a personal computer (PC), a server computer, a database computer, etc. Computing system 10 may comprise a single computing system or a plurality of computing systems. Computing system 10 comprises a network communication port 26 (e.g., a modem or a network card for receiving and transmitting wired and/or wireless communication), a generic storage medium 14a, a central processing unit (CPU) 28, and a memory device 14b. Generic storage medium 14a may comprise a single memory system. Alternatively, generic storage medium 14a may comprise a plurality of memory systems. Generic storage medium 14a may be internal to computing system 10 (e.g., as illustrated in FIG. 1) or external to computing system 10. Generic storage medium 14a may comprise any number or configuration of storage devices such as hard disks, solid-state flash drives, optical storage media (CDs or DVDs), etc. Memory device 14b may comprise a single memory system. Alternatively, memory device 14b may comprise a plurality of memory systems. Memory device 14b may be internal to computing system 10 (e.g., as illustrated in FIG. 1) or external to computing system 10.

System 2 allows a potential user 8 of a computing system 10 (e.g., a computer work station) to designate a request to use/access computing system 10. The request is entered through user terminal 12. The request is carried through network communication port 26 (e.g., a modem or a network card for receiving and transmitting wired and/or wireless communication) through which user access is managed via system bus 24. Generic Storage Medium 14a comprises sections dedicated to storing authentication method list/tables 20 (i.e., as illustrated and described with respect tables 1 and 2, infra) and action tables 22 (i.e., as illustrated and described with respect to table 3, infra). Messages transmitted through system bus 24 are controlled by CPU 28 and routed to an appropriate destination in memory device 14b. Memory device 14b comprises an access method and assignment software application 32 (i.e., for implementing the algorithm of FIG. 2 as described, infra) and an operating system/addition computer programs 34. The following tables 1 and 2 illustrate a logical design for method list/tables 20 (e.g., relational database tables) as illustrated in FIG. 1.

TABLE 1

| SE-QUENCE | AUTH METHOD | ACCOUNT | PASSWORD | DURATION |
|---|---|---|---|---|
| 1 | PasswordEntry | db2inst3 | temp1234 | <null> |

Table 1 illustrates an initial default access method stack table. Table 1 comprises a single row comprising an execution sequence (e.g., 1) for an authorization method, an authorization method (i.e., use of a password), an account number for a user (db2inst3), a password (temp1234), and a duration (null).

TABLE 2

| SE-QUENCE | AUTH METHOD | ACCOUNT | PASS-WORD | DURATION |
|---|---|---|---|---|
| 1 | PasswordEntry | db2inst3 | alpha123 | 30 days |
| 2 | RetinalScan | db2inst3 | <scan data> | Default |
| 3 | Fingerprint | db2inst3 | <print data> | 45 days |
| 4 | VoiceRecognition | db2inst3 | <voice data> | 15 days |

Table 2 illustrates a populated access method stack table. Table 2 has been populated with execution sequences for authorization methods, multiple authorization methods, account numbers for a user, passwords, and durations.

The following table 3 illustrates a logical design for action tables 22 (e.g., relational database tables) as illustrated in FIG. 1.

TABLE 3

| CONDITION | ACTION_TAKEN |
|---|---|
| VirusDetected | Advance to next authentication method in stack |
| PasswordChanged | No action; enforce access with new password |
| IntervalChanged | Use same method, reset to new effective interval |
| IntervalExpires | Advance to next authentication method in stack |
| LastMethodInStack | Return to top of authentication method stack |
| InvalidAccessAttempt | Refuse access; notify system administrator |
| AccountSuspended | Prohibit system access by any authentication method |

Action tables 22 comprises tables each comprising a list of system CONDITIONS that when detected to be in effect, trigger an action specified in a corresponding ACTION field. For example, when the effective time interval specified in one of method list/tables 20 has expired, a condition "IntervalExpires" goes into effect triggering an action corresponding to that condition (i.e., a current expired authentication method is deactivated and a next authentication method in the sequential stack of methods is enforced). This condition and its corresponding action are found in the fourth row of table 4.

The following implementation examples illustrate processes used by computing system 10 for requiring, implementing, and enforcing a change in a method of authentication used in applications in order to promote increased security.

Example 1

A secure application system (e.g., computing system 10) comprising highly confidential data has a plurality of authentication methods available (e.g., account/password, iris scan, facial recognition, voice recognition, fingerprint analysis, and DNA sampling). A current method of authentication for computing system 10 comprises a fingerprint scanner. A user requesting access to computing system 10 arranges to have his/her fingerprint analyzed and upon successful correlation of his/her fingerprint to authentication data stored in the application (i.e., from authentication method list/tables 20 as illustrated in table 2) the user will gain access to computing system 10. In an instance in which a virus is detected on computing system 10, a "VirusDetected" condition (i.e., as specified in action tables 22 as illustrated in table 3) is detected and an action listed in action tables 22 (table 3) corresponding to this condition is enabled (i.e., "advance to next authentication method in stack"). The next authentication method in the stack comprises voice recognition as described in table 2, supra.

Example 2

A security policy for a secure application system (e.g., computing system 10) requires that a current authentication method must be changed after it has been in effect for a certain time interval (i.e., as specified in authentication method list/tables 20 as illustrated in table 2). When the time interval expires, an "IntervalExpires" condition (i.e., as specified in action tables 22 as illustrated in table 3) is detected, and an action listed in action tables 22 (table 3) corresponding to this condition is enabled (i.e., "advance to next authentication method in stack"). The next authentication method in the stack comprises voice recognition as described in table 2, supra.

Example 1 and example 2 relate to a sequential progression of authenticated methods in a stack table (i.e., when method X is no longer activated, a security protocol will enforce method X+1).

Figure 2:
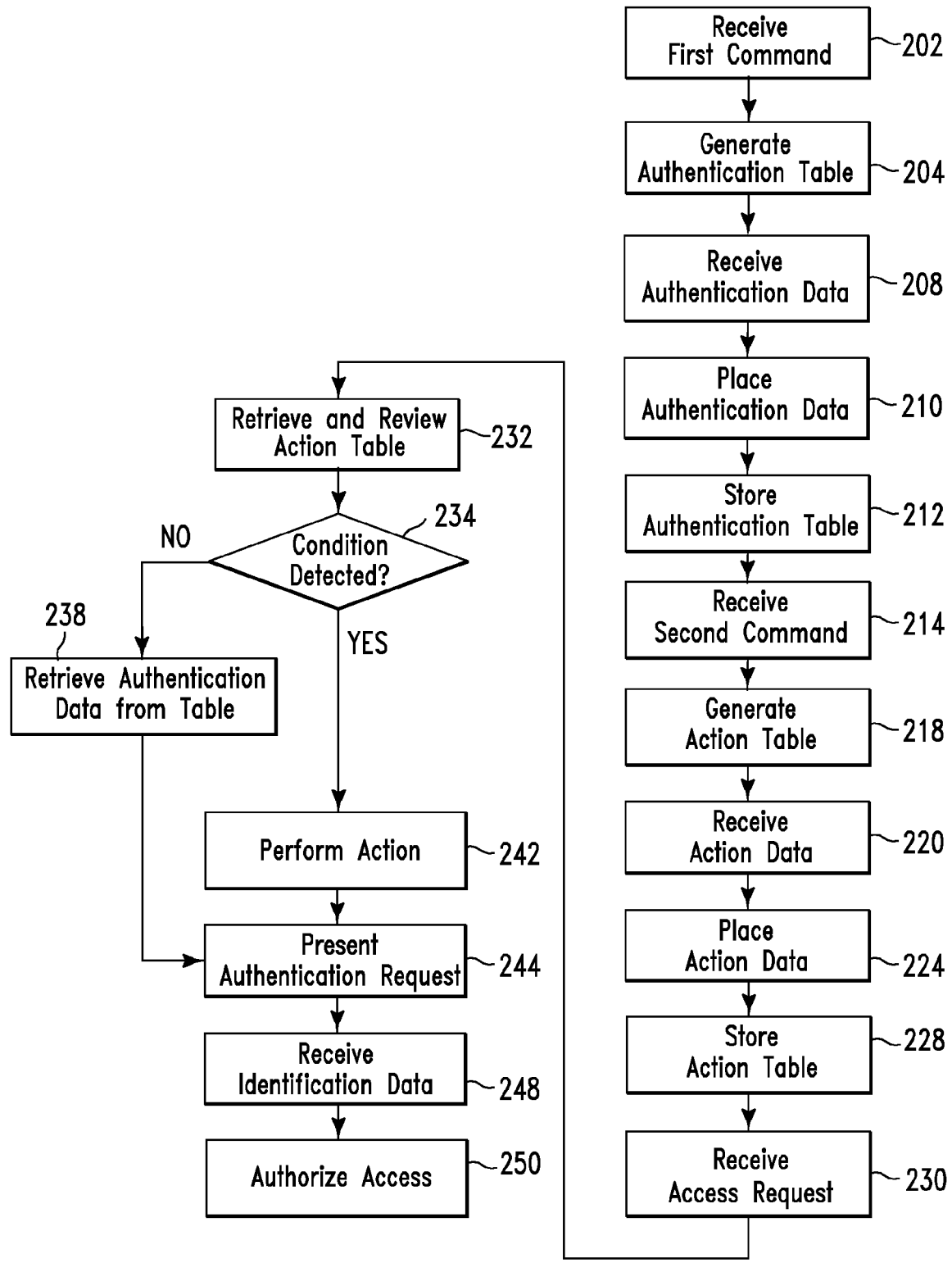
FIG. 2 illustrates an algorithm describing a process used by the system of FIG. 1 for providing and implementing multiple authentication means for authenticating a user, in accordance with embodiments of the present invention.

FIG. 2 illustrates an algorithm describing a process used by system 2 of FIG. 1 for providing and implementing multiple authentication means for authenticating a user, in accordance with embodiments of the present invention. In step 202, a computing system (e.g., computing system 10 of FIG. 1) receives (i.e., from a user) a first command for generating an authentication table associated with the user. In step 204, the computing system generates (i.e., in response to the first command) an authentication table. In step 208, the computing system receives (i.e., from the user) first authentication data and second authentication data. The first authentication data comprises a first authentication method. The second authentication data comprises a second authentication method differing from the first authentication method. For example, the first authentication method could comprise a password authentication method and the second authentication method could comprise a retinal scan authentication method. In step 210, the computing system places the first authentication data in a first entry row of the authentication table and the second authentication data in a second entry row of the authentication table. In step 212, the computing system stores the authentication table comprising the first authentication data and the second authentication data. In step 214, the computing system receives (i.e., from the user) a second command for generating an action table associated with the user and the authentication table. In step 218, the computing system generates (i.e., in response to the second command) an action table. In step 220, the computing system receives (from the user) first action data and second action data. The first action data comprises a first condition and a first associated action. The second action data comprises a second condition and a second associated action. In step 224, the computing system places the first action data in a first entry row of the action table and the second action data in a second entry row of the action table. In step 228, the computing system stores the action table comprising the first action data and the second action data. In step 230, the computing system receives (from the user) a user request for accessing the computing system. For example, the user may request to access secure data in the computing system. In step 232, the computing system retrieves and reviews the action table (i.e., the first action data and the second action data) stored in step 228. In step 234, it is determined (i.e., based on the review of step 232) if the first condition or the second condition have been detected.

If in step 234, it is determined that the first condition or the second condition have been detected then in step 242, a specified action (i.e., specified in the action table) is performed and an authentication request is presented to the user in step 244 as described, infra. The following scenarios illustrate examples of specified actions.

Scenario 1

1. The computing system disables access to the first authentication data in the first entry row of the authentication table (i.e., based on instructions associated with the first associated action).

2. The computing system retrieves from the second entry row of the authentication table in response to the disabling, the second authentication data.

Scenario 2

1. The computing system generates first modified authentication data from the first authentication data in the first entry row of the authentication table (i.e., based on instructions associated with the first associated action). Generating the first modified authentication data may comprise replacing a first portion of the first authentication data with a first portion of replacement data (e.g., a new password).

2. The computing system replaces the first authentication data in the first entry row of the authentication table with the first modified authentication data.

3. The computing system retrieves (i.e., from the first entry row of the authentication table) the first modified authentication data.

If in step 234, it is determined that the first condition or the second condition have not been detected then in step 238, the computing system retrieves from the first entry row (or an entry row that is next in the sequence) of the authentication table, the first authentication data and an authentication request is presented to the user in step 244 as described, infra. The first authentication data may (optionally) be checked to determine if the first authentication data comprises valid entries.

In step 244, an authentication request is presented to the user. The authentication request presented to the user may be associated with the first authentication data (i.e., from step 234), the second authentication data (i.e., as specified in scenario 1), or the first modified authentication data (i.e., as specified in scenario 2). In step 248, the computing system receives (i.e., from the user) identification data in accordance with the authentication request. In step 250, the computing system authorizes (i.e., in response to receiving the identification data) the user request for accessing the computing system.

Figure 3:
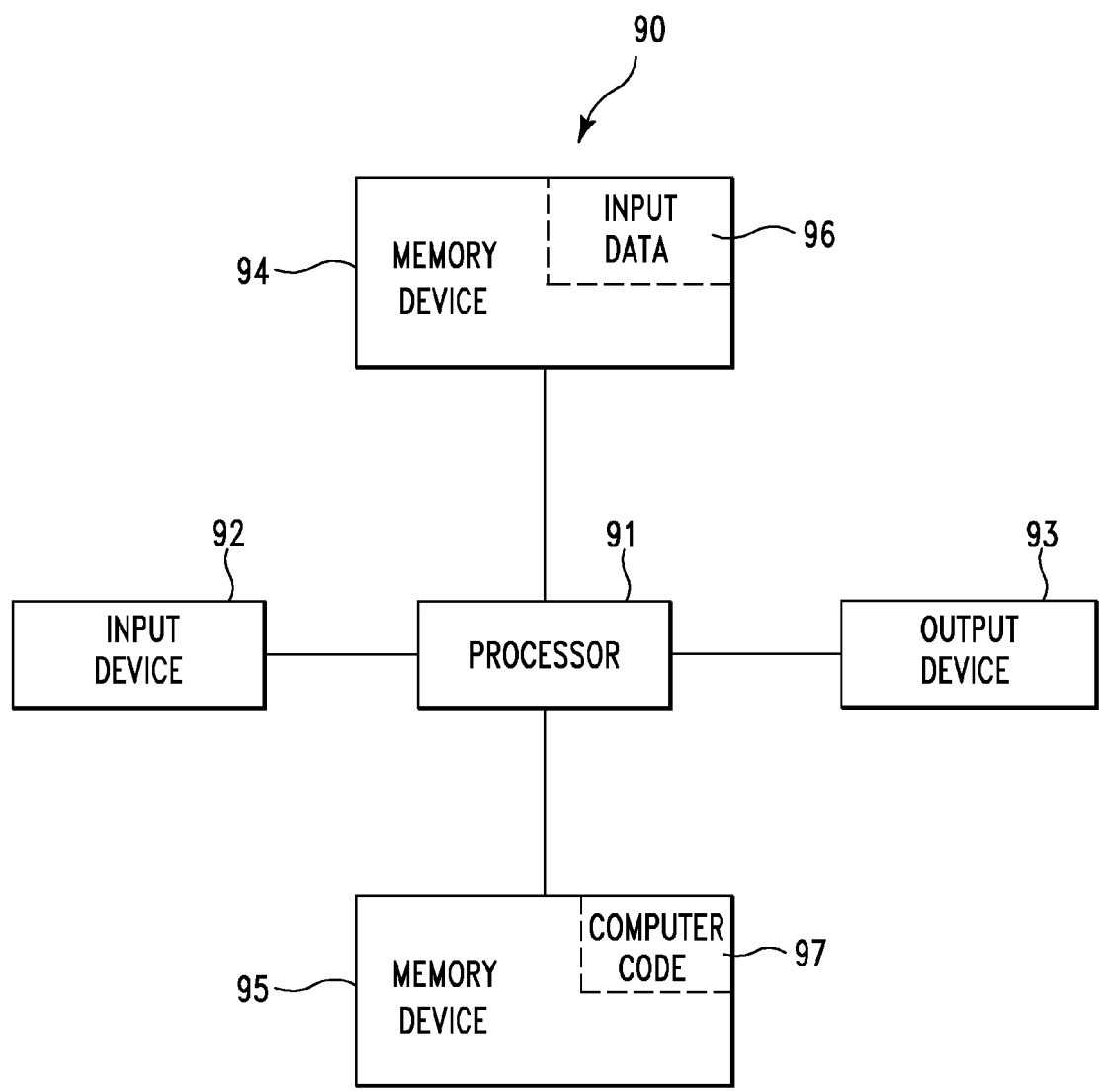
FIG. 3 illustrates a computer system used for providing and implementing multiple authentication means for authenticating a user, in accordance with embodiments of the present invention.

FIG. 3 illustrates a computer system 90 (e.g., computing system 10 in FIG. 1) used for providing and implementing multiple authentication means for authenticating a user, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm for providing and implementing multiple authentication means for authenticating a user (e.g., the algorithm of FIG. 2). The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 3) may comprise the algorithm of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be deployed, managed, serviced, etc. by a service provider who offers to provide and implement multiple authentication means for authenticating a user. Thus the present invention discloses a process for deploying or integrating computing infrastructure, comprising integrating computer-readable code into the computer system 90, wherein the code in combination with the computer system 90 is capable of performing a method for providing and implementing multiple authentication means for authenticating a user. In another embodiment, the invention provides a business method that performs the process steps of the invention on a subscription, advertising, and/or fee basis. That is, a service provider, such as a Solution Integrator, could offer to provide and implement multiple authentication means for authenticating a user. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method, comprising:

receiving, by a computing system from a user, a first command for generating an authentication table associated with said user;

generating, by said computing system in response to said first command, said authentication table;

receiving, by said computing system from said user, first authentication data and second authentication data, wherein said first authentication data comprises: a first authentication method enabling a first secure login process for said computing system, a first execution sequence for said first authentication method, a first account number for said user, and a first duration associated with a time period that when expired automatically disables said first authentication method and automatically enables a second authentication method, wherein said second authentication data comprises: said second authentication method enabling a second secure login process for said computing system, a second execution sequence for said second authentication method, a second account number for said user, and a second duration associated with a time period that when expired automatically disables said second authentication method and automatically enables an additional authentication method, and wherein said first authentication method, said second authentication method, and said additional authentication method each comprise a different authentication method;

placing, by said computing system, said first authentication data in a first entry row of said authentication table;

placing, by said computing system, said second authentication data in a second entry row of said authentication table;

storing, by said computing system, said authentication table comprising said first authentication data and said second authentication data;

receiving, by said computing system from said user, a second command for generating an action table associated with said user and said authentication table;

generating, by said computing system in response to said second command said action table;

receiving, by said computing system from said user, first action data and second action data, wherein said first action data comprises a first condition and a first associated action associated with automatically selecting said first authentication method, said second authentication method, or said additional authentication method when said first condition is detected, wherein said first condition comprises a first detected change within said computing system, wherein said second action data comprises a second condition and a second associated action associated with automatically selecting said first authentication method, said second authentication method, or said additional authentication method when said second condition is detected, and wherein said second condition comprises a second detected change within said computing system;

placing, by said computing system, said first action data in a first entry row of said action table;

placing, by said computing system, said second action data in a second entry row of said action table; and storing, by said computing system, said action table comprising said first action data and said second action data.

2. The method of claim 1, further comprising:

receiving, by said computing system from said user, a user request for accessing said computing system;

retrieving, by said computing system from said first entry row of said authentication table in response to said request, said first authentication data;

determining, by said computing system, that said first authentication data comprises valid entries;

presenting, by said computing system to said user in response to results of said determining, an authentication request associated with said first authentication method;

receiving, by said computing system from said user in response to said authentication request, first identification data associated with said first authentication method and said first authentication data; and authorizing, by said computing system in response to said receiving said first identification data, said user request for accessing said computing system.

3. The method of claim 1, further comprising:

receiving, by said computing system from said user, a user request for accessing said computing system;

retrieving, by said computing system, said action table;

reviewing, by said computing system, said first condition and said second condition; and determining, by said computing system in response to said reviewing, if said first condition or said second condition has been detected.

4. The method of claim 3, wherein said determining determines that said first condition and said condition have not been detected, and wherein said method further comprises:

retrieving, by said computing system from said first entry row of said authentication table in response to said user request, said first authentication data;

presenting, by said computing system to said user, an authentication request associated with said first authentication method;

receiving, by said computing system from said user in response to said authentication request, first identification data associated with said first authentication method and said first authentication data; and authorizing, by said computing system in response to said receiving said first identification data, said user request for accessing said computing system.

5. The method of claim 3, wherein said determining determines that said first condition has been detected, and wherein said method further comprises:

disabling, by said computing system based on instructions associated with said first associated action, access to said first authentication data in said first entry row of said authentication table;

retrieving, by said computing system from said second entry row of said authentication table in response to said disabling, said second authentication data;

presenting, by said computing system to said user in response to said retrieving said second authentication data, an authentication request associated with said second authentication method;

receiving, by said computing system from said user in response to said authentication request, first identification data associated with said second authentication method and said second authentication data; and authorizing, by said computing system in response to said receiving said first identification data, said user request for accessing said computing system.

6. The method of claim 3, wherein said determining determines that said first condition has been detected, and wherein said method further comprises:

generating, by said computing system based on instructions associated with said first associated action, first modified authentication data from said first authentication data in said first entry row of said authentication table, wherein said generating said first modified authentication data comprises replacing a first portion of said first authentication data with a first portion of replacement data;

replacing, by said computing system, said first authentication data in said first entry row of said authentication table with said first modified authentication data;

retrieving, by said computing system from said first entry row of said authentication table in response to said replacing, said first modified authentication data;

presenting, by said computing system to said user in response to said retrieving said first modified authentication data, an authentication request associated with said first authentication method;

receiving, by said computing system from said user in response to said authentication request, first identification data associated with said first authentication method and said first modified authentication data; and authorizing, by said computing system in response to said receiving said first identification data, said user request for accessing said computing system.

7. The method of claim 1, wherein each of said first condition and said second condition is selected form the group consisting of a detected virus, a changed password, an invalid access attempt, a suspended account, and a changed interval.

8. The method of claim 1, wherein said user request for accessing said computing system comprises a request for accessing specified files in said computing system.

9. A process for supporting computer infrastructure, said process comprising providing at least one support service for at least one of creating, integrating, hosting, maintaining, and deploying computer-readable code in a computing system, wherein the code in combination with the computing system is capable of performing the method of claim 1.

10. A computer program product, comprising a computer storage medium comprising a computer readable program code embodied therein, said computer readable program code configured to perform the method of claim 1 upon being executed by a processor of said computing system.

11. A computing system comprising a processor coupled to a computer-readable memory unit, said memory unit comprising instructions that when executed by the processor implements an authentication method, said method comprising:

receiving, by said computing system from a user, a first command for generating an authentication table associated with said user;

generating, by said computing system in response to said first command, said authentication table;

receiving, by said computing system from said user, first authentication data and second authentication data, wherein said first authentication data comprises: a first authentication method enabling a first secure login process for said computing system, a first execution sequence for said first authentication method, a first account number for said user, and a first duration associated with a time period that when expired automatically disables said first authentication method and automatically enables a second authentication method, wherein said second authentication data comprises: said second authentication method enabling a second secure login process for said computing system, a second execution sequence for said second authentication method, a second account number for said user, and a second duration associated with a time period that when expired automatically disables said second authentication method and automatically enables an additional authentication method, and wherein said first authentication method, said second authentication method, and said additional authentication method each comprise a different authentication method;

placing, by said computing system, said first authentication data in a first entry row of said authentication table;

placing, by said computing system, said second authentication data in a second entry row of said authentication table;

storing, by said computing system, said authentication table comprising said first authentication data and said second authentication data;

receiving, by said computing system from said user, a second command for generating an action table associated with said user and said authentication table;

generating, by said computing system in response to said second command said action table;

receiving, by said computing system from said user, first action data and second action data, wherein said first action data comprises a first condition and a first associated action associated with automatically selecting said first authentication method, said second authentication method, or said additional authentication method when said first condition is detected, wherein said first condition comprises a first detected change within said computing system, wherein said second action data comprises a second condition and a second associated action associated with automatically selecting said first authentication method, said second authentication method, or said additional authentication method when said second condition is detected, and wherein said second condition comprises a second detected change within said computing system;

placing, by said computing system, said first action data in a first entry row of said action table;

placing, by said computing system, said second action data in a second entry row of said action table; and storing, by said computing system, said action table comprising said first action data and said second action data.

12. The computing system of claim 11, wherein said method further comprises:
receiving, by said computing system from said user, a user request for accessing said computing system;
retrieving, by said computing system from said first entry row of said authentication table in response to said request, said first authentication data;
determining, by said computing system, that said first authentication data comprises valid entries;
presenting, by said computing system to said user in response to results of said determining, an authentication request associated with said first authentication method;
receiving, by said computing system from said user in response to said authentication request, first identification data associated with said first authentication method and said first authentication data; and
authorizing, by said computing system in response to said receiving said first identification data, said user request for accessing said computing system.

13. The computing system of claim 11, wherein said method further comprises:
receiving, by said computing system from said user, a user request for accessing said computing system;
retrieving, by said computing system, said action table;
reviewing, by said computing system, said first condition and said second condition; and
determining, by said computing system in response to said reviewing, if said first condition or said second condition has been detected.

14. The computing system of claim 13, wherein said determining determines that said first condition and said condition have not been detected, and wherein said method further comprises:
retrieving, by said computing system from said first entry row of said authentication table in response to said user request, said first authentication data;
presenting, by said computing system to said user in response to results of said determining that said first authentication data comprises valid entries, an authentication request associated with said first authentication method;
receiving, by said computing system from said user in response to said authentication request, first identification data associated with said first authentication method and said first authentication data; and
authorizing, by said computing system in response to said receiving said first identification data, said user request for accessing said computing system.

15. The computing system of claim 13, wherein said determining determines that said first condition has been detected, and wherein said method further comprises:
disabling, by said computing system based on instructions associated with said first associated action, access to said first authentication data in said first entry row of said authentication table;
retrieving, by said computing system from said second entry row of said authentication table in response to said disabling, said second authentication data;
presenting, by said computing system to said user in response to said retrieving said second authentication data, an authentication request associated with said second authentication method;
receiving, by said computing system from said user in response to said authentication request, first identification data associated with said second authentication method and said second authentication data; and
authorizing, by said computing system in response to said receiving said first identification data, said user request for accessing said computing system.

16. The computing system of claim 13, wherein said determining determines that said first condition has been detected, and wherein said method further comprises:
generating, by said computing system based on instructions associated with said first associated action, first modified authentication data from said first authentication data in said first entry row of said authentication table, wherein said generating said first modified authentication data comprises replacing a first portion of said first authentication data with a first portion of replacement data;

replacing, by said computing system, said first authentication data in said first entry row of said authentication table with said first modified authentication data;

retrieving, by said computing system from said first entry row of said authentication table in response to said replacing, said first modified authentication data;

presenting, by said computing system to said user in response to said retrieving said first modified authentication data, an authentication request associated with said first authentication method;

receiving, by said computing system from said user in response to said authentication request, first identification data associated with said first authentication method and said first modified authentication data; and authorizing, by said computing system in response to said receiving said first identification data, said user request for accessing said computing system.

17. The computing system of claim 11, wherein each of said first condition and said second condition is selected form the group consisting of a detected virus, a changed password, an invalid access attempt, a suspended account, and a changed interval.

18. The computing system of claim 11, wherein said user request for accessing said computing system comprises a request for accessing specified files in said computing system.

* * * * *